Dec. 19, 1933.　　　G. B. WILSON　　　1,940,037
LUBRICATING MECHANISM
Filed Nov. 10, 1930
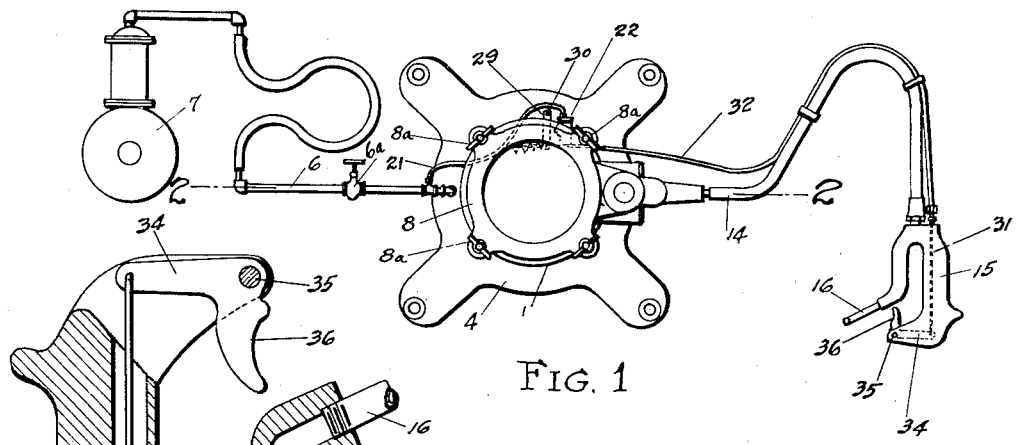
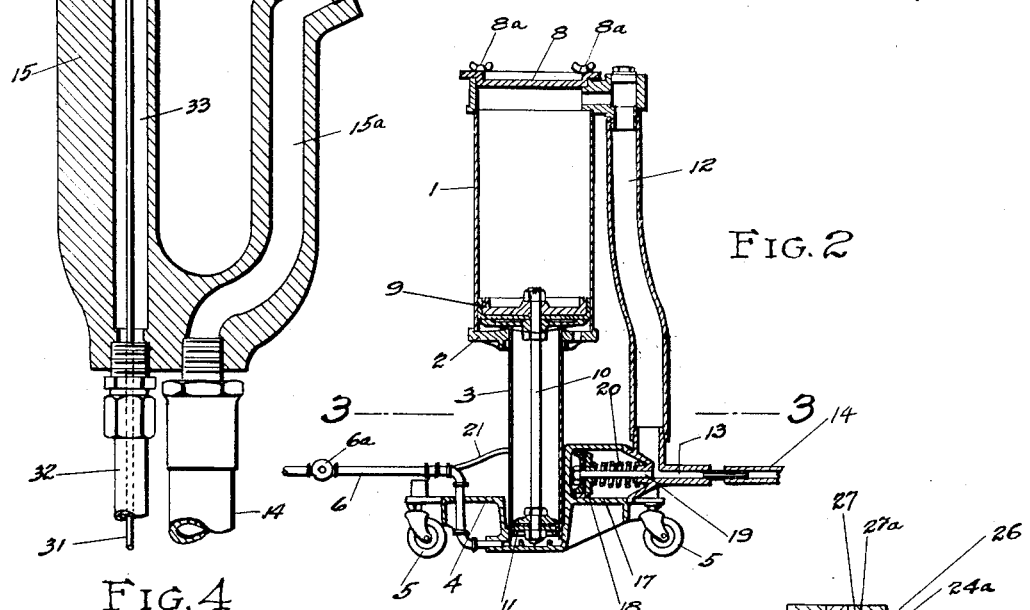
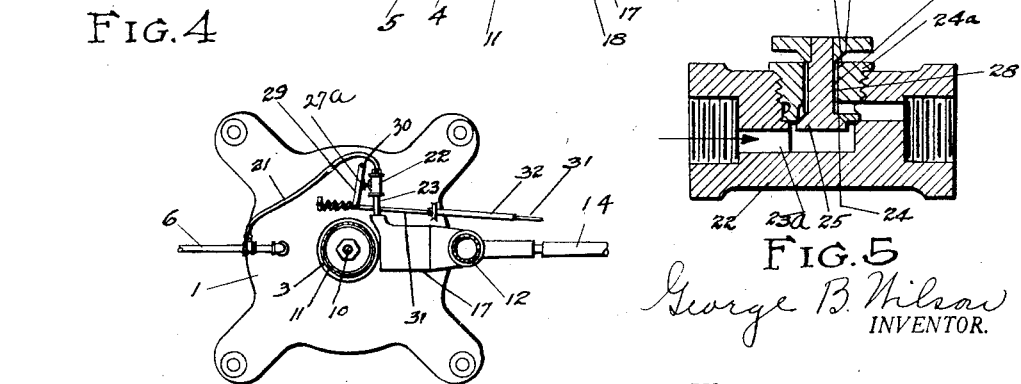
George B. Wilson
INVENTOR.
BY
ATTORNEYS.

Patented Dec. 19, 1933

1,940,037

UNITED STATES PATENT OFFICE 1,940,037

LUBRICATING MECHANISM

George B. Wilson, Erie, Pa.

Application November 10, 1930
Serial No. 494,463

1 Claim. (Cl. 221—47.1)

Pressure lubricating systems are of two general types, one in which the supply of grease and the forcing mechanism are handled directly by the operator at the point of use and another system in which the grease receptacle is placed at some distance from the point of use, but controlled from the point of use. The present invention is preferably proportioned for the latter type of use and is so exemplified in the accompanying drawing. In carrying out the invention a receptacle is provided for the supply of grease and the grease in this receptacle is maintained under pressure by the air pressure supply through which the lubricating system is operated. A receptacle capable of sustaining the full air pressure is expensive and one of the purposes of the present invention is to so form the apparatus that while air pressure may be used for maintaining the grease supply under pressure through which it is advanced to the forcing mechanism the bursting pressure on the grease receptacle is comparatively small. A further object of the invention is to so arrange the structure that the grease pressure will not of itself effect a discharge through the apparatus. Features and details of the invention will appear from the specification and claims.

A preferred embodiment of the invention is illustrated in the accompanying drawing as follows:—

Fig. 1 shows a plan view of the apparatus.

Fig. 2 a section on the line 2—2 in Fig. 1.

Fig. 3 a section on the line 3—3 in Fig. 2.

Fig. 4 an enlarged section of the operating grip.

Fig. 5 a sectional view of operating valve.

1 marks the grease receptacle, 2 a fixed head on the receptacle, 3 a pressure cylinder in the structure shown forming a support for the grease receptacle, 4 a platform in which the pressure cylinder 3 is mounted, and 5 casters on the platform to facilitate the movement of the supply receptacle to a convenient point of use. Air under pressure is supplied through a pipe 6 from any convenient source, such as a compressor 7. The receptacle is provided with a removable cover 8 which is secured by thumb nuts 8a. The receptacle is provided with a plunger 9 which has a rod 10 extending into the pressure cylinder 3 and secured to a piston 11 operating in the pressure cylinder 3. The supply connection 6 leads to the bottom of the pressure cylinder and in use the air is left on the pressure cylinder continuously, thus forcing the piston 11 upwardly and exerting pressure on the plunger 9 so as to maintain the grease under pressure. The plunger 9 is very much larger than the plunger 11, usually about seven to one and with an air pressure varying from seventy-five to two hundred pounds it is not a difficult matter to have the receptacle 1 of sufficient capacity to carry this pressure.

The grease under pressure is delivered through the hose 12 to the forcing barrel 13. A flexible conduit 14 leads from the barrel to the point of use, the lubricant extending into a passage 15a in a grip 15 and thence to the lubricant applying tube 16 supplied with a fitting for readily connecting it with a bearing connection (not shown).

A forcing cylinder 17 has a forcing piston 18 and this piston actuates the forcing plunger 19 operating in the barrel 13. A spring 20 retracts the piston 18 and with it the forcing plunger 19. Air is delivered to the cylinder 17 by way of a pipe 21, valve 22 and pipe 23, forming a connection between the supply pipe 6 and the cylinder 17. The valve 22 has a valve passage 23a, and a valve seat 24 on which a valve head 25 operates. The seat 24 is formed in a fitting 24a. The valve stem 26 extends through this fitting and has a seat 27 at its upper end which is engaged by a valve head 27a at the upper end of the stem 26. An escape passage 28 extends through the stem so that when the valve head 27a is up the air is exhausted and when the valve head 25 is down communication is formed from the pipe 21 to the pipe 23 and the exhaust is closed through the closing of the valve head 27a.

The valve is operated through the following mechanism:—A lever 29 operates on the head 27a. It is pivoted on the base at 30. A flexible wire 31 is secured to the lever and extends through a flexible coupling 32 to and through a passage 33 in the grip and is secured to a lever 34. The lever is pivoted by a pin 35 on the grip and provided with a trigger 36 by means of which the flexible rod, or wire 31 may be actuated from a point remote from the receptacle.

In operation, the operator takes the grip, places the lubricating fitting, or connection 16 into position to deliver grease, pulls the trigger 36 which, operating through the flexible connection, actuates the valve 22 and this admits air back of the piston 18 and results in a forced stroke of the forcing plunger 19. With each operation a definite amount of grease is forced forward by the plunger and delivered to the bearing under high pressure. By making the tube 14 with relation to the pressure the frictional resistance along the tube is sufficient to prevent the discharge of grease under the comparatively low pressure on the receptacle. This friction may be relied on even through a wide range of pressures so that it is not a delicate adjustment. While I prefer this manner of preventing the discharge, any simple resistance may be supplied.

What I claim as new is:—

In a lubricating mechanism, the combination of a grease receptacle; a pressure plunger in the receptacle; a pressure cylinder; a piston in the pressure cylinder of smaller diameter than the plunger actuating said plunger; means supplying fluid pressure to the cylinder; a forcing barrel; a forcing plunger in the barrel; a connection between the receptacle and the barrel; a lubricating connection leading from the barrel having a grease flow resistance greater than the pressure in the receptacle; a forcing cylinder; a forcing piston in the forcing cylinder actuating the forcing plunger; and a connection between the fluid pressure supply means and the forcing cylinder.

GEORGE B. WILSON.